(12) United States Patent
Maniar et al.

(10) Patent No.: US 9,888,624 B2
(45) Date of Patent: Feb. 13, 2018

(54) INDIVIDUAL ROW LIFT SYSTEM FOR PLANTERS

(71) Applicant: CNH Industrial America LLC, New Holland, PA (US)

(72) Inventors: Alihaider Maniar, Skokie, IL (US); Marvin A. Prickel, Homer Glen, IL (US); David Schulte, Woodridge, IL (US)

(73) Assignee: CNH Industrial America LLC, New Holland, PA (US)

( * ) Notice: Subject to any disclaimer, the term of this patent is extended or adjusted under 35 U.S.C. 154(b) by 142 days.

(21) Appl. No.: 14/755,552

(22) Filed: Jun. 30, 2015

(65) Prior Publication Data

US 2017/0000020 A1    Jan. 5, 2017

(51) Int. Cl.
*A01C 7/20* (2006.01)
*A01C 7/08* (2006.01)

(52) U.S. Cl.
CPC .............. *A01C 7/201* (2013.01); *A01C 7/088* (2013.01); *A01C 7/20* (2013.01); *A01C 7/203* (2013.01)

(58) Field of Classification Search
CPC ............ A01C 7/20; A01C 7/201; A01C 7/203
See application file for complete search history.

(56) References Cited

U.S. PATENT DOCUMENTS

| | | | |
|---|---|---|---|
| 4,413,685 A | 11/1983 | Gremelspacher et al. | |
| 5,129,282 A | 7/1992 | Bassett et al. | |
| 5,961,573 A | 10/1999 | Hale et al. | |
| 6,144,910 A | 11/2000 | Scarlett et al. | |
| 6,698,523 B2 | 3/2004 | Barber | |
| 8,201,637 B2 | 6/2012 | Ripple | |
| 8,522,889 B2 | 9/2013 | Adams et al. | |
| 8,544,397 B2 | 10/2013 | Bassett | |
| 8,752,642 B2 | 6/2014 | Whalen et al. | |
| 2010/0319941 A1 | 12/2010 | Peterson | |
| 2012/0000405 A1* | 1/2012 | Remoue | A01B 63/22 111/9 |
| 2014/0116735 A1* | 5/2014 | Bassett | A01B 61/044 172/2 |
| 2014/0277959 A1* | 9/2014 | Wagers | A01C 21/005 701/50 |

* cited by examiner

*Primary Examiner* — Jerrah Edwards
*Assistant Examiner* — Kelly D Williams
(74) *Attorney, Agent, or Firm* — Rebecca L. Henkel; Rickard K. DeMille (57) ABSTRACT

An agricultural planter has a chassis with a tool bar and at least one row unit. Each row unit is carried by the tool bar and has a fluid actuator and a linkage assembly connecting it to the tool bar. The linkage assembly and fluid actuator allows the row unit to be raised and lowered. A control module is operable to individually raise and lower each row unit on the agricultural planter using the fluid actuator in response to either a manual input, an automatically determined requirement or condition of the at least one row unit, or an automatically determined operating condition of the agricultural planter. The control module is further operable to prevent the raising or lowering of an individual row unit on the agricultural planter based on either a configuration of the agricultural planter or the potential occurrence of an undesirable weight or drag distribution.

17 Claims, 8 Drawing Sheets

INDIVIDUAL ROW LIFT SYSTEM FOR PLANTERS

BACKGROUND OF THE INVENTION

1. Field of the Invention

The present invention relates to agricultural planters, and, more particularly, to agricultural planters having individual row units that can be raised and lowered.

2. Description of the Related Art

Agricultural planters are commonly used implements to plant seeds in soil. An agricultural planter can include a chassis that carries one or more storage tanks full of seeds or other particulate that is to be spread on a field for planting, a hitch mechanism that attaches to a tractor or other implement pulled by a tractor, and a tool bar to which row units can be connected so that they are carried by the chassis.

Each row unit of the agricultural planter places seeds in the field. Typically, the row units are laterally arranged along a length of the tool bar so that as the planter is pulled across the field, each row unit plants seeds at predefined intervals along the path it is pulled across. To plant seeds, the row units perform four main operations as they are pulled: opening a trench in the soil; placing a seed into the formed trench at appropriate intervals; closing the formed trench to put soil on top of the placed seed; and packing soil on top of the seed to provide desirable soil contact with the placed seed. To open a trench in the soil, a furrowing disc, also called an opening disc, presses into the soil and rotates, dislocating soil as it rotates to form the trench. Once the trench is open, a seed is placed in the trench by a metering device which receives seeds from the main storage tank(s) or a row unit storage tank and typically utilizes a combination of differential air pressure and gravity to place the seed in the trench at predefined intervals along the pulled path so that adjacent seeds in the row are not too close to one another. One or more closing discs carried behind the furrowing disc are pressed into the soil and also rotate as the planter is pulled to replace soil dislocated by the furrowing disc in the trench or dislocate adjacent soil into the trench to cover the seed placed in the trench with soil. Finally, one or more pressing wheels carried behind the closing disc(s) exerts pressure on the soil covering the seed to press the soil down onto the seed and provide good soil contact with the seed. By having multiple row units working in unison as the planter is pulled across a field, many seeds can be effectively planted in an efficient manner.

Agricultural planters, like other agricultural implements, are often very wide, in order to efficiently perform their function over a large area in a given pass by the implement. In order to accomplish this, and yet to be transportable by road, they are often built to be folded into a transport configuration and unfolded into a working configuration. Additionally, given this very wide working configuration, agricultural planters and other agricultural implements are commonly provided with articulating hinges or joints that allow them to conform to ground contours. Such wide agricultural planters often encounter conditions wherein it is suitable to operate certain row units, while deactivating other row units. It is known to raise and lower sections of row units in unison. However, it is sometimes needed to be able to raise and lower individual row units in order to respond to specific usage requirements, such as when the plantable ground is smaller than the usable width of the agricultural planter, or when natural ground conditions or obstacles call for it.

Under these conditions, a sudden and/or uneven raising of row units can introduce unwanted uneven weight or drag distribution, with detrimental effects on the agricultural planter or on the tractor pulling it. Further, raising too many row units in one portion of the agricultural planter may cause it to sink excessively and compact the soil unnecessarily. Additionally, responding to a command to raise or lower an individual row unit without considering the state of the agricultural planter may result in the individual row unit being raised or lowered when the tool bar height prevents full travel of the row unit.

What is needed in the art is an agricultural planter that is operable to automatically or manually respond to specific usage requirements of the row units, such as the plantable ground being less than the overall width of the agricultural planter, and to natural ground conditions, such as rough terrain, ditches, streams, obstacles, and the like, while recognizing and avoiding raising and lowering individual row units under certain conditions such as ground conditions or conditions that would result in unsafe uneven weight or drag distribution.

SUMMARY OF THE INVENTION

The present invention to automatically or manually respond to specific usage requirements of the row units and to natural ground conditions while recognizing and avoiding raising and lowering individual row units under certain conditions such as ground conditions or conditions that would result in unsafe uneven weight or drag distribution.

The invention in one form is directed to an agricultural planter having a chassis with a tool bar and at least one row unit. Each row unit is carried by the tool bar and has a fluid actuator and a linkage assembly connecting it to the tool bar. The linkage assembly and fluid actuator allows the row unit to be raised and lowered. A control module is operable to individually raise and lower each row unit on the agricultural planter using the fluid actuator in response to either a manual input, an automatically determined requirement or condition of the at least one row unit, or an automatically determined operating condition of the agricultural planter. The control module is further operable to prevent the raising or lowering of an individual row unit on the agricultural planter based on either a configuration of the agricultural planter or the potential occurrence of an undesirable weight or drag distribution.

The invention in another form is directed to a control system for an agricultural planter having a chassis with a tool bar and at least one row unit. Each row unit is carried by the tool bar and is operable to be raised and lowered by a fluid actuator. The control system is operable to individually raise and lower each row unit on the agricultural planter using the fluid actuator in response to either a manual input, an automatically determined requirement or condition of the at least one row unit, or an automatically determined operating condition of the agricultural planter. The control system is further operable to prevent the raising or lowering of an individual row unit on the agricultural planter based on either a configuration of the agricultural planter or the potential occurrence of an undesirable weight or drag distribution.

The invention in another form is directed to a method for operating an agricultural planter having a chassis with a tool bar and at least one row unit. Each row unit is carried by the tool bar and is operable to be raised and lowered by a fluid actuator. The method takes the steps of individually raising and lowering each row unit on the agricultural planter using the fluid actuator in response to either a manual input, an automatically determined requirement or condition of the at least one row unit, or an automatically determined operating condition of the agricultural planter. The method takes the further steps of preventing the raising or lowering of each individual row unit on the agricultural planter based on either a configuration of the agricultural planter or the potential occurrence of an undesirable weight or drag distribution.

An advantage of the present invention is that it allows for individual raising and lowering of row units while recognizing and avoiding unsafe uneven weight or drag distribution and other such detrimental effects.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Referring now to the drawings, and more particularly to FIGS. 1 through 5, there is shown an embodiment of an agricultural planter 5 according to the present invention which generally includes a chassis 10 forming a support structure for components of the agricultural planter 5. The agricultural planter 5 can be formed by a hitch assembly 12 at a front of the agricultural planter 5 connected to a tool bar 14, main wheels 16 carried by the chassis 10 near the rear of the agricultural planter 5, one or more storage tanks 18, 20 and 22 that can be filled with seed or other agriculture material carried by the chassis 10, and a plurality of row units 24 connected to the tool bar 14 and arranged laterally across a length of the tool bar 14 so that they are carried by the chassis 10.

The hitch assembly 12 can include a hitch 26 configured to be connected to a tractor or other agricultural implement (not shown) so that the agricultural planter 5 can be pulled in a forward direction of travel 110. The hitch 26 can be integrally formed with or connected to a hitch bar 28 that is connected to the tool bar 14 by bracing bars 30 and one or more folding cylinders 32. As can be seen, the agricultural planter 5 can also have various hydraulic, pneumatic, and electrical lines (unnumbered) throughout to support various cylinders and systems that are included on the agricultural planter 5. A marking device 36 can be connected to each lateral end of the tool bar 14 and extendable so that a marking disc 38 of the marking device 36 can create a line in the soil as the agricultural planter 5 is pulled that helps a user in positioning the agricultural planter 5 to create subsequent rows. A stair assembly 40 can be mounted to the back of the agricultural planter 5 to allow for an operator to access the storage tanks 20 and 22.

The chassis 10 of the agricultural planter 5 is further divided into a center section 44 that remains in fixed relation perpendicular with the hitch assembly 12 both when the agricultural planter 5 is in a working configuration and when the agricultural planter 5 is folded for transport, a right hand wing section 60, and a left hand wing section 80. The right hand wing section 60 has at least one right hand wing section wheel 68, and the left hand wing section 80 has at least one left hand wing section wheel 88. The right hand wing section 60 and the left hand wing section 80 are foldable forward about the hitch bar 28 using folding cylinders 32 when the agricultural planter 5 is folded for transport. When the agricultural planter 5 is in its working configuration as shown in FIGS. 1-5, it is sufficiently wide that it is provided with a right hand wing horizontal pivot joint 62 and a left hand wing horizontal pivot joint 82, which allows right hand wing section 60 and left hand wing section 80, respectively, to articulate up and down in order to conform to ground contours.

Figure 1:
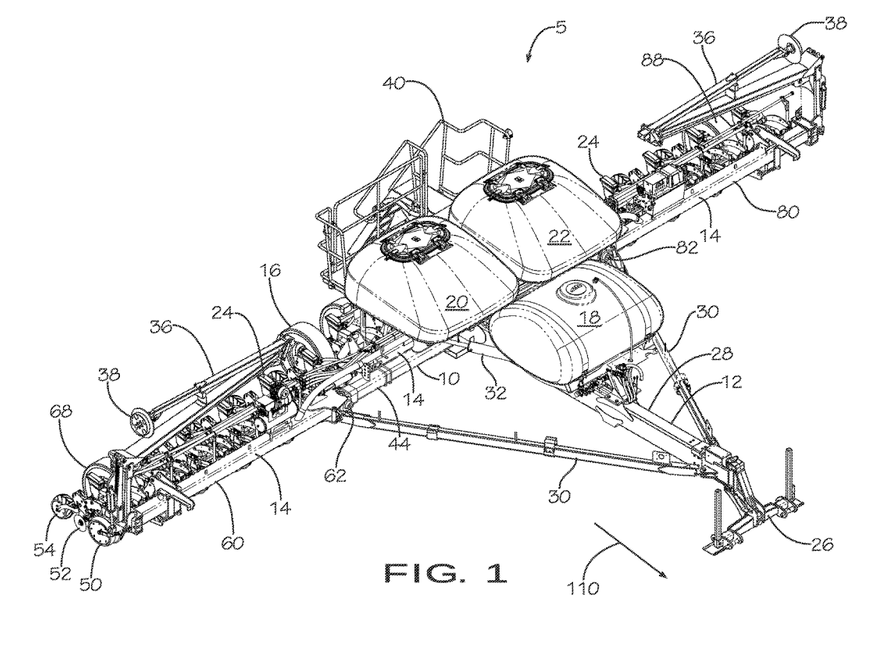
FIG. 1 is an isometric view of an embodiment of an agricultural planter according to the present invention.
Figure 2:
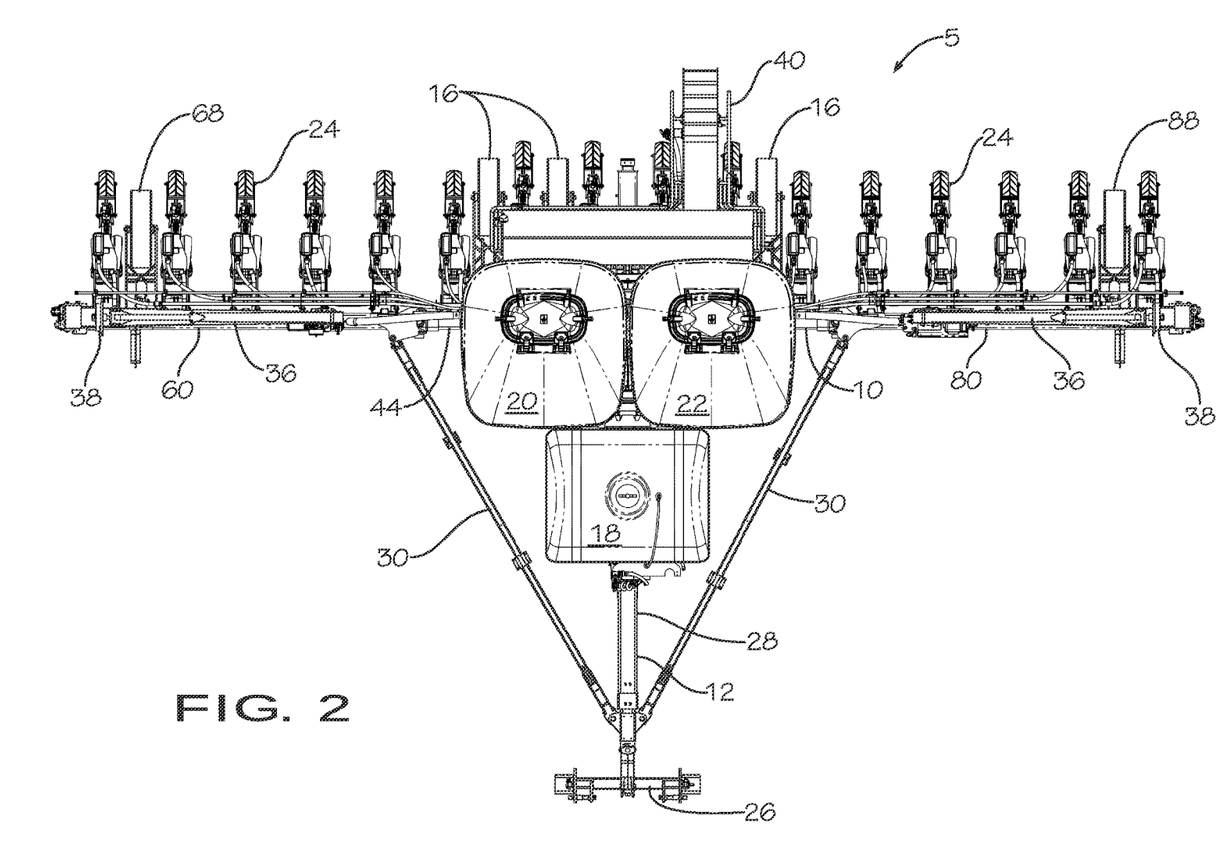
FIG. 2 is a top view of the agricultural planter shown in FIG. 1.
Figure 3:
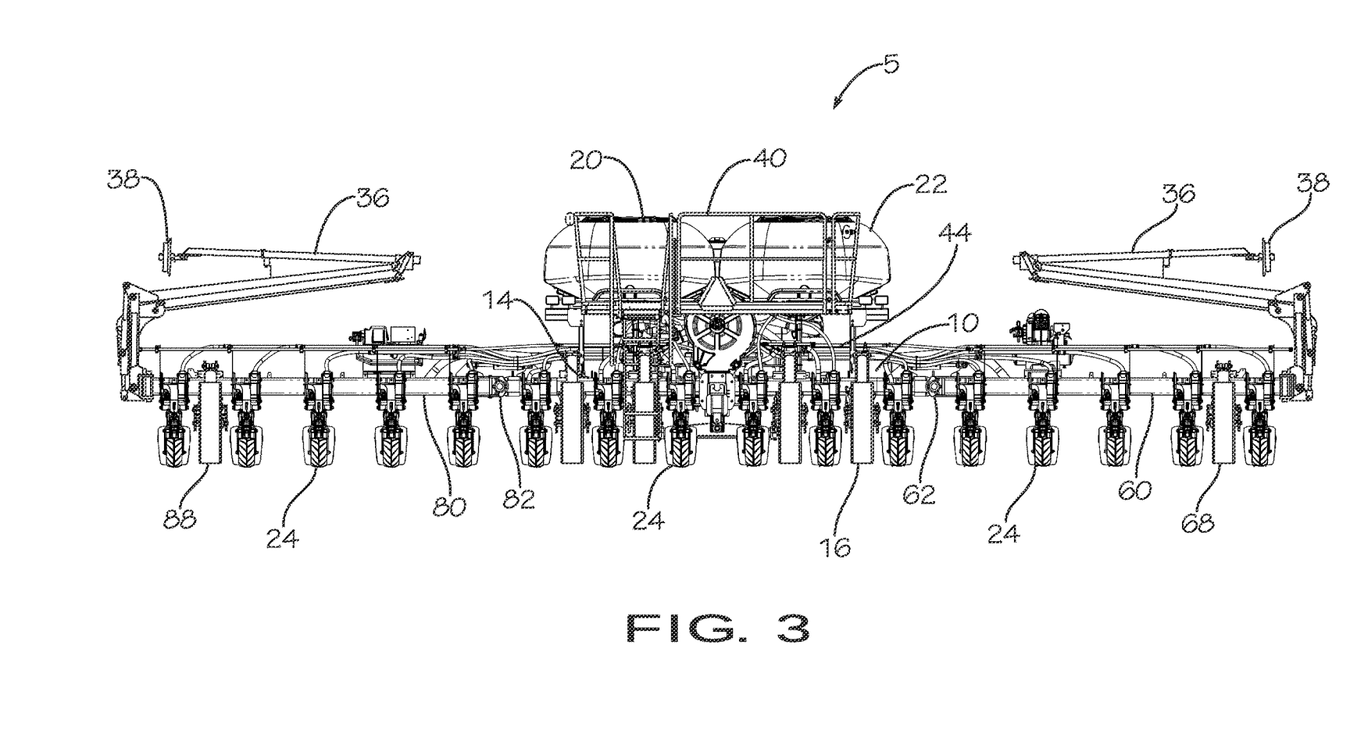
FIG. 3 is a rear view of the agricultural planter shown in FIGS. 1 and 2.
Figure 4:
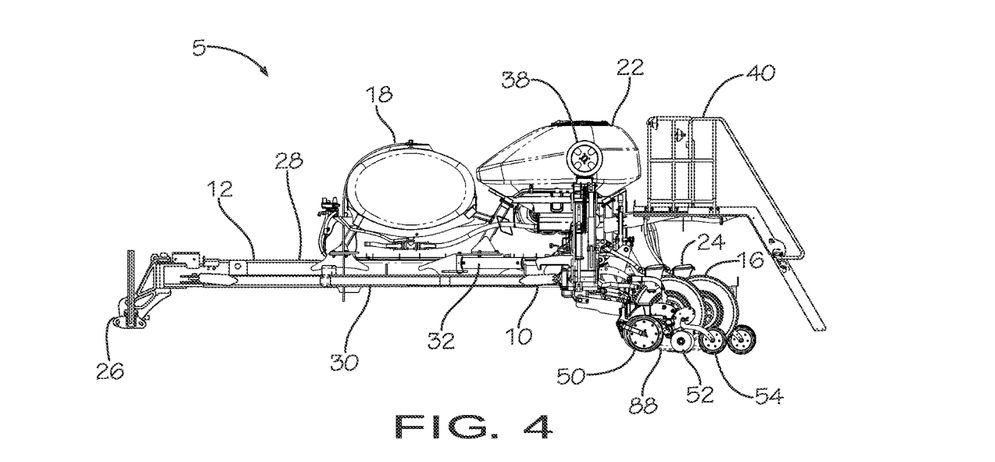
FIG. 4 is a left view of the agricultural planter shown in FIGS. 1-3.
Figure 5:
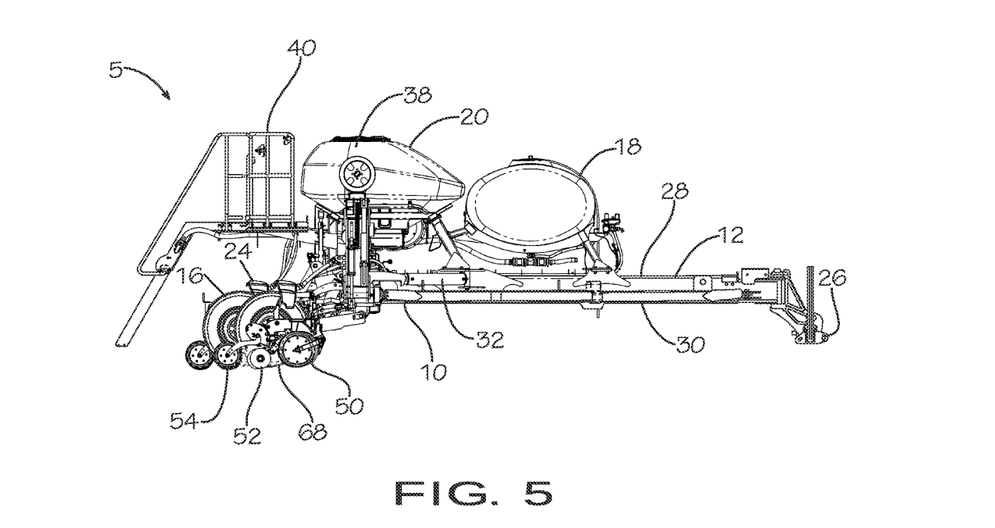
FIG. 5 is a right view of the agricultural planter shown in FIGS. 1-4.
Figure 6:
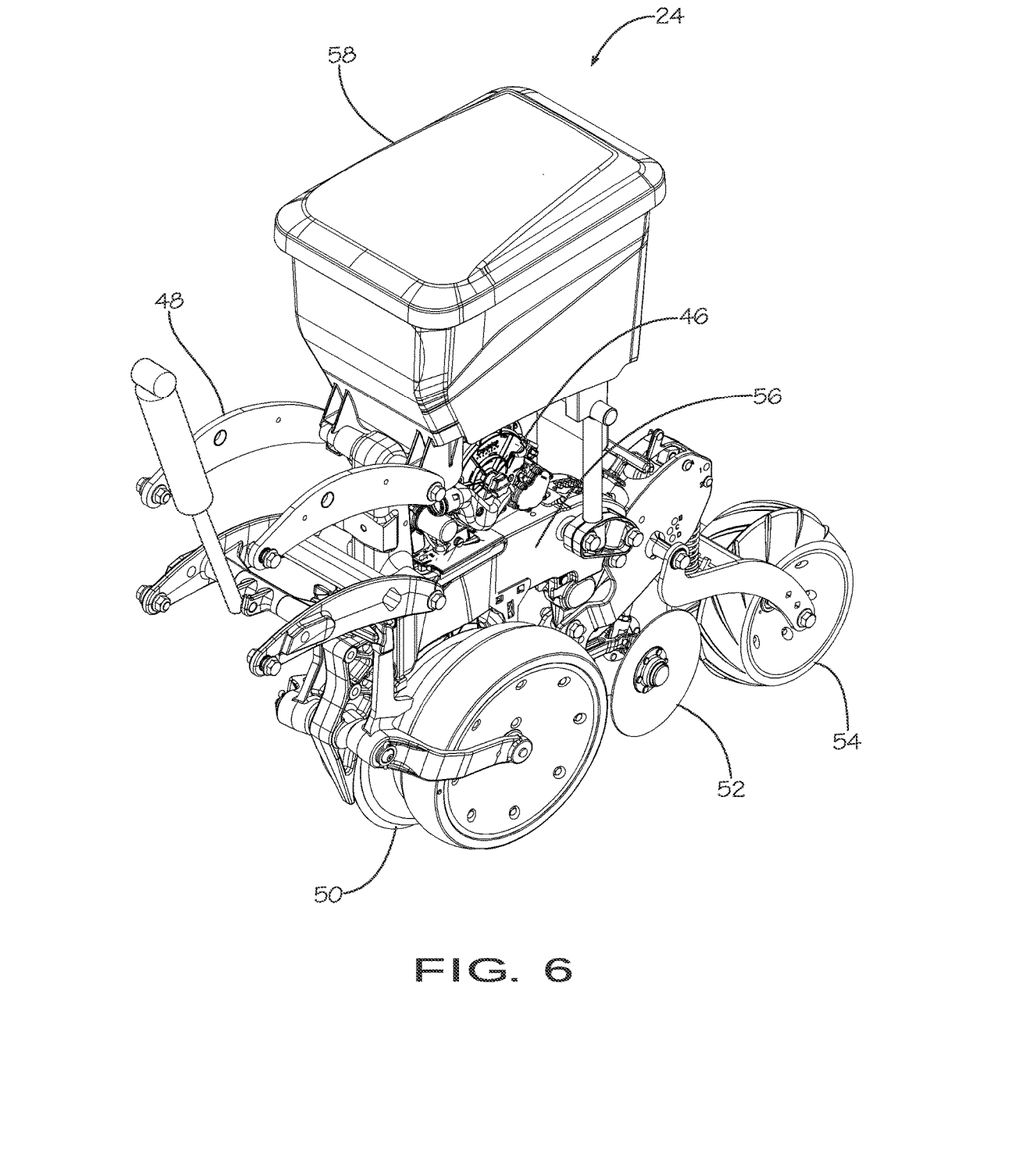
FIG. 6 is an isometric view of an embodiment of a row unit of an agricultural planter according to the present invention.

Each of the row units 24 located on the tool bar 14 of the respective center section 44, right hand wing section 60, and left hand wing section 80, is provided with furrowing discs 50, closing discs 52, and pressing wheels 54. Such a row unit 24 is shown in FIG. 6. The row unit 24 shown in FIG. 6 is further provided with a frame 56, a hopper 58, and a seed distributing mechanism 46. A linkage assembly 48 connects the row unit 24 to the tool bar 14 (not shown in FIG. 6), and provides for vertical motion of the row unit 24 relative to the tool bar 14. A row unit hydraulic lift cylinder 42 is connected to the linkage assembly 48 and to the tool bar 14, and is usable to lift the individual row unit 24 up and off the ground.

Figure 7:
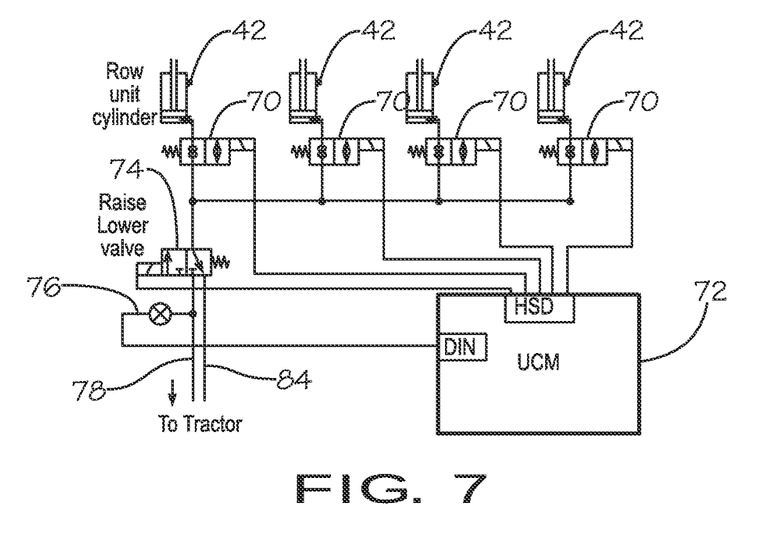
FIG. 7 is a schematic of an embodiment of an electrical and hydraulic arrangement according to an embodiment of the invention.

Each individual row unit 24 has its own hydraulic lift cylinder 42 with its own electronically controlled solenoid valve 70. Each electronically controlled solenoid valve 70 is connected to a control module 72, which is also connected to an electronically controlled raise/lower valve 74 and to pressure transducers 76 and 86. Hydraulic supply 78 and return 84 lines lead from and to a towing tractor (not shown) and provide hydraulic pressure. The control module 72 is operable either automatically or on command of an operator to raise an individual row unit 24 by first determining whether there is hydraulic pressure in the hydraulic supply line 78, second activating raise/lower valve 74, and then opening the individual row unit's electronically controlled solenoid valve 70. The control module 72 is further operable either automatically or on command of an operator to lower an individual row unit 24 by deactivating raise/lower valve 74 and then opening the individual row unit's electronically controlled solenoid valve 70.

Figure 8:
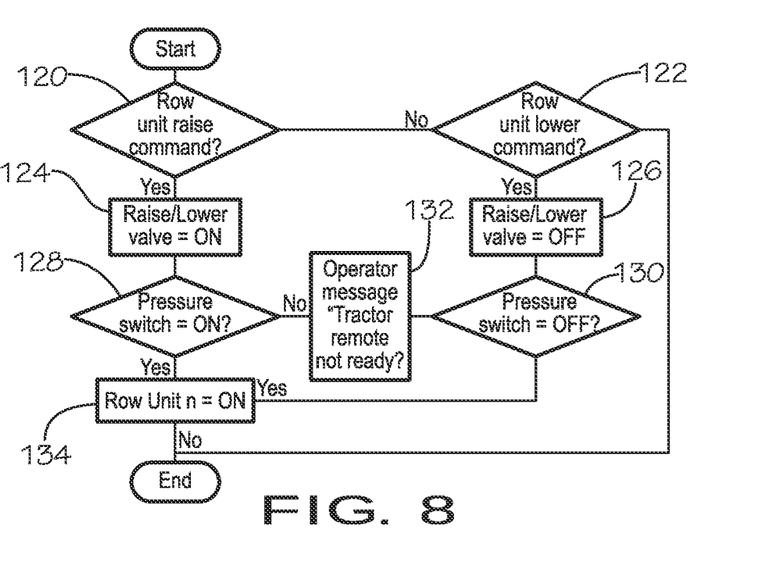
FIG. 8 is a flowchart illustrating an embodiment of a control method carried out on the controller depicted in FIG. 7.
Figure 9:
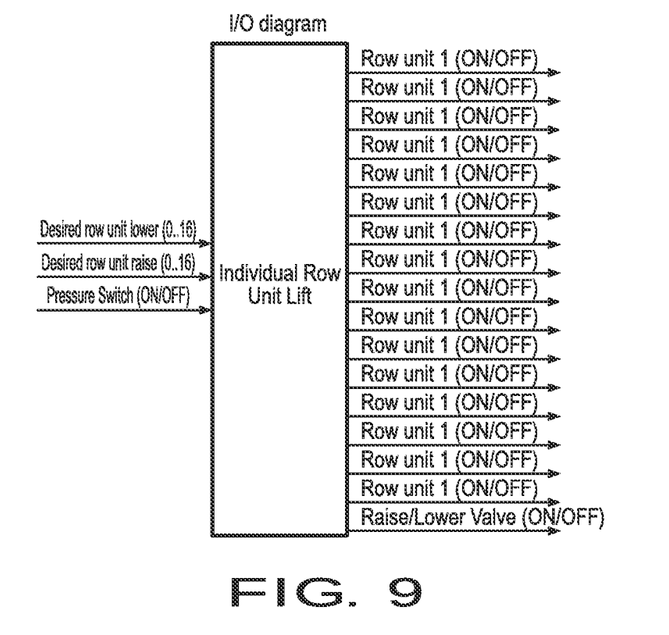
FIG. 9 is a further representation of inputs and outputs of the controller depicted in FIG. 7.

Note that the hydraulic lift cylinder 42 indicated in FIG. 7 is indicated as a single acting push type cylinder, although a double acting push/pull type cylinder may be used, and is represented as such in FIG. 6, wherein the row unit 24 is lifted from the ground when the cylinder is acting in pull. In this case, the raise/lower valve 74 and individual electronically controlled solenoid valve 70 would be replaced by individual direction control valves. In the arrangement where a single acting cylinder is used, a method is represented in FIGS. 8, 9, and 10 that the control module 72 undertakes when raising or lowering individual row units 24.

At step 120, the control module 72 determines whether a command has been given to raise an individual row unit 24. If so, the control module 72 places the raise/lower valve 74 in the on state at step 124. Then control module 72 determines through pressure transducer 76 whether there is hydraulic pressure in hydraulic supply line 78 at step 128. If so, the control module 72 places the individual row unit's electronically controlled solenoid valve 70 in the on state at step 134. If not, the control module 72 sends a "tractor remote not ready" message to the operator at step 132. If no command has been given to raise an individual row unit 24 at step 120, the control module 72 determines if a row unit lower command has been given at step 122. If not, the routine ends. If so, the control module 72 places the raise/lower valve 74 in the off state at step 126. Then control module 72 determines through pressure transducer 76 whether there is pressure in hydraulic supply line 78. If there is pressure in hydraulic supply line 78, the control module 72 sends a "tractor remote not ready" message to the operator at step 132. If not, the control module 72 places the individual row unit's electronically controlled solenoid valve 70 in the on state at step 134.

Figure 10:
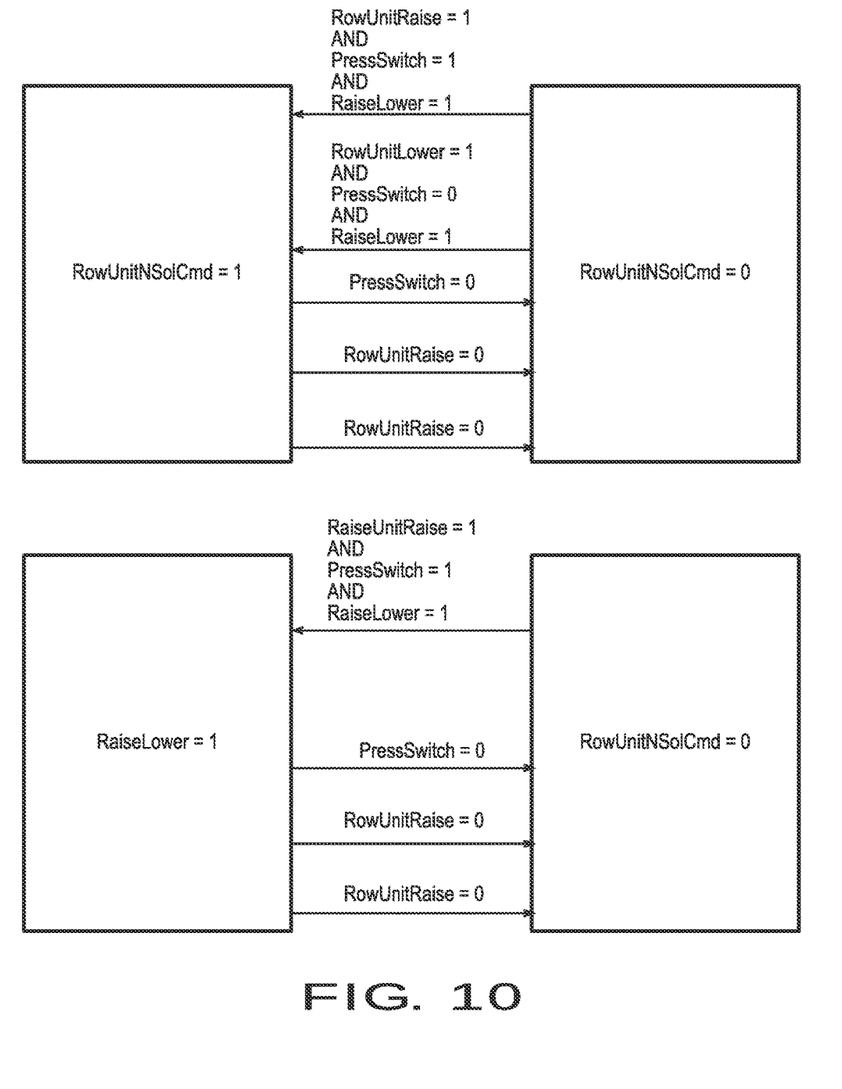
FIG. 10 is a further representation of the relationship of conditions and outputs of the controller depicted in FIG. 7.

FIG. 10 shows a logic diagram representing the above method where:

RowUnitNSolCmd is the state of the individual row unit electronically controlled solenoid valve.

RowUnitRaise is the state of the command to raise a row unit 24.

RowUnitLower is the state of the command to lower a row unit 24.

PressSwitch is the state of the pressure transducer 76.

RaiseLower is the state of the raise/lower valve 74.

Control module 72 is operable to be automatically or manually configured to respond to specific usage requirements or conditions of the row units 24 of the agricultural planter 5 or to the operating conditions of the agricultural planter 5. For example, when the plantable ground is less than the overall width of the agricultural planter 5, the individual row units 24 outside the plantable ground can be raised. When natural ground conditions such as rough terrain, ditches, streams, obstacles, and the like are encountered, the control module 72 is operable to lift the individual row units 24 likely to encounter such obstacles. Further, through GPS connectivity and other mapping routines, the control module 72 is operable to raise individual row units 24 when encountering boundaries with other areas where crops have already been planted, or when encountering property lines. A communication network (not shown) between the control module 72 and the individual row units 24 gives information to the control module 72 on the raised or lowered status of the individual row units 24, along with sensory information regarding obstacles and the like through sensors commonly known and used in the art (not shown).

A further use for individual control of row units 24 is the ability to use the agricultural planter 5 for multiple row width plantings. For example, the agricultural planter 5 may be arranged with row units 24 every 15 inches along the tool bar 14. By raising every other row unit 24, the agricultural planter 5 may be used for plantings spaced at 30 inches, without extensive and time consuming rearrangement. Further, raising unneeded row units 24 conserves fuel consumed by the towing tractor by eliminating unnecessary drag.

Importantly, the control module 72 is programmed to recognize and prevent raising and lowering individual row units 24 under certain conditions. For example, the control module 72 is programmed to prevent raising and lowering row units 24 when the tool bar height prevents full travel of the row unit. This may be encountered when the tool bar 14 is passing over a particularly high obstacle, such that forcibly lowering the individual row unit 24 would put too much of the weight of the agricultural planter 5 upon it, thereby damaging it. This may also occur when the tool bar 14 is raised, and the agricultural planter 5 is either in the transport configuration or transitioning from the working configuration to the transport configuration and back again, wherein raising the individual row unit 24 may cause it to interfere with another component of the agricultural planter, or may result in the agricultural planter 5 having an undesired uneven weight balance or too high of a center of gravity.

Furthermore, the control module 72 is programmed to limit the number and distribution of row units raised off of the ground at one time, in order to prevent uneven weight or drag distribution. For example, if all row units 24 on one wing section 60 or 80 are raised at the same time while all row units on the center section 44 and/or opposite wing section 80 or 60 are left engaged with the ground, the uneven drag across the width of the agricultural planter 5 will cause a torque about a vertical axis of the agricultural planter 5. Depending on ground or terrain conditions, this torque may produce a detrimental effect on the agricultural planter 5 or the towing tractor, especially if such torque occurs suddenly instead of incrementally. Therefore, the control module 72 may delay raising a certain number of row units 24, or raise them incrementally. Another example may be if the agricultural planter 5 is operating in soft ground conditions, lifting too many row units 24 at one time may excessively load one or more of the wing section wheels 68 or 88 for the ground conditions, causing it to sink into the ground excessively, thereby compacting the ground. Therefore, the control module 72 may delay raising a certain number of row units 24 even though they are unneeded, and can be otherwise shut off, until the agricultural planter has left the plantable area.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural planter having a working configuration and a transport configuration, comprising:

a chassis having a tool bar;

at least one row unit, each said row unit being carried by said tool bar, each said row unit having a linkage assembly connecting said row unit to said tool bar and allowing said row unit to be raised and lowered, each said row unit having a fluid actuator operable to raise and lower said row unit; and a control module operable to individually raise and lower each said row unit on said agricultural planter when the agricultural planter is in a working configuration using said fluid actuator in response to one of:
- a manual input,
- an automatically determined requirement or condition of said at least one row unit, or
- an automatically determined operating condition of the agricultural planter; and said control system operable to prevent individually raising and lowering each said row unit on said agricultural planter based on
- a potential occurrence of an undesirable weight or drag distribution resulting in a torque about a vertical axis of the agricultural planter while the agricultural planter is in the working configuration, said control system operable to delay individually raising and lowering each said row unit on said agricultural planter while the agricultural planter is in the working configuration based on a potential occurrence of an undesirable weight or drag distribution resulting in a torque about a vertical axis of the agricultural gainer, said control system operable to incrementally raise and lower individual row units while the agricultural planter is in the working configuration based on a potential occurrence of an undesirable weight or drag distribution resulting in a torque about a vertical axis of the agricultural planter, wherein raising and lowering of each said row unit is conducted by said control system to avoid sudden detrimental torque to the agricultural planter at least while the agricultural planter is in the working configuration, and wherein the number of row units lifted off the ground at one time while the agricultural planter is in the working configuration is restricted by the control system.

2. The agricultural planter of claim 1, wherein:
said at least one row unit is a seed planter.

3. The agricultural planter of claim 1, wherein:
each said fluid actuator is a hydraulic lift cylinder having an electronically controlled solenoid valve connected to said control module and also connected to a single electronically controlled raise/lower valve.

4. The agricultural planter of claim 3, wherein:
said control module being connected to a pressure transducer in a hydraulic supply line connected to said single electronically controlled raise/lower valve, said control module utilizing said pressure transducer to determine a state of pressurization of said hydraulic supply line before raising or lowering said row unit.

5. The agricultural planter of claim 1, wherein:
each said fluid actuator is a hydraulic lift cylinder having an electronically controlled two-way direction control valve.

6. The agricultural planter of claim 1, wherein:
said automatically determined requirement or condition of said at least one row unit includes a natural ground condition.

7. The agricultural planter of claim 1, wherein:
said automatically determined operating condition of the agricultural planter includes an artificial boundary.

8. The agricultural planter of claim 1, wherein:
said configuration of the agricultural planter includes a height of said tool bar.

9. A control system for an agricultural planter having a working configuration and a transport configuration and having a chassis, a tool bar, and at least one row unit, each row unit being carried by the tool bar and being operable to be raised and lowered by a fluid actuator, the control system operable to:
individually raise and lower each said row unit on said agricultural planter when the agricultural planter is in a working configuration using said fluid actuator in response to one of:
- a manual input,
- an automatically determined requirement or condition of said at least one row unit, or
- an automatically determined operating condition of the agricultural planter;

said control system operable to prevent individually raising and lowering each said row unit on said agricultural planter based on
- a potential occurrence of an undesirable weight or drag distribution resulting in a torque about a vertical axis of the agricultural planter while the agricultural planter is in the working configuration, said control system operable to delay individually raising and lowering each said row unit on said agricultural planter while the agricultural planter is in the working configuration based on a potential occurrence of an undesirable weight or drag distribution resulting in a torque about a vertical axis of the agricultural planter, said control system operable to incrementally raise and lower individual row units while the agricultural planter is in the working configuration based on a potential occurrence of an undesirable weight or drag distribution resulting in a torque about a vertical axis of the agricultural planter, wherein raising and lowering of each said row unit is conducted by said control system to avoid sudden detrimental torque to the agricultural planter at least while the agricultural planter is in the working configuration, and wherein the number of row units lifted off the ground at one time while the agricultural planter is in the working configuration is restricted by the control system.

10. The control system of claim 9, wherein:
each said fluid actuator is a hydraulic lift cylinder having an electronically controlled solenoid valve connected to said control system and also connected to a single electronically controlled raise/lower valve.

11. The control system of claim 10, wherein:
said control system being connected to a pressure transducer in a hydraulic supply line connected to said single electronically controlled raise/lower valve, said control system utilizing said pressure transducer to determine a state of pressurization of said hydraulic supply line before raising or lowering said row unit.

12. The control system of claim 9, wherein:
each said fluid actuator is a hydraulic lift cylinder having an electronically controlled two-way direction control valve.

13. The control system of claim 9, wherein:
said automatically determined requirement or condition of said at least one row unit includes a natural ground condition.

14. The control system of claim 9, wherein:
said automatically determined operating condition of the agricultural planter includes an artificial boundary.

15. The control system of claim 9, wherein:
said configuration of the agricultural planter includes a height of said tool bar.

16. The agricultural planter of claim 8, wherein a height of the tool bar which prevents full travel of the row unit includes:
when the tool bar is passing over a high obstacle,
when the agricultural planter is in a transport configuration, or
when the agricultural planter is transitioning between working and transport configurations.

17. The control system of claim 15, wherein a height of the tool bar which prevents full travel of the row unit includes:
when the tool bar is passing over a high obstacle,
when the agricultural planter is in a transport configuration, or
when the agricultural planter is transitioning between working and transport configurations.

* * * * *